United States Patent

[11] 3,618,715

| [72] | Inventor | James L. Bostwick<br>1501 Bluff Drive, Santa Barbara, Calif. 93105 |
|---|---|---|
| [21] | Appl. No. | 860,922 |
| [22] | Filed | Sept. 25, 1969 |
| [45] | Patented | Nov. 9, 1971 |

[54] AUTOMATIC BRAKE-ADJUSTING DEVICE
8 Claims, 10 Drawing Figs.

[52] U.S. Cl. .................................................. 188/79.5 K, 188/196 BA
[51] Int. Cl. .................................................. F16d 65/56
[50] Field of Search .................................... 188/79.5 K, 79.5 P, 196 RR

[56] References Cited
UNITED STATES PATENTS
| 2,554,065 | 5/1951 | Shields | 188/79.5 K |
| 3,307,661 | 3/1967 | Bostwick | 188/75.5 K |
| 3,371,755 | 3/1968 | Leeper | 188/196 RR |

Primary Examiner—Duane A. Reger
Attorney—Paul A. Weilein

ABSTRACT: In combination with conventional brake power cylinder and brake-operating arm for a cam brake with a manual slack adjuster including a shaft rotatable to effect slack adjustment, a housing fixed to move with the brake-operating arm and into which the shaft projects and a ratchet wheel on the projecting shaft, a plunger or slide movable in the housing adjacent the wheel carries a pawl biased into contact with the wheel. A push rod guided into the housing moves the slide with respect to the wheel in response to motion of the brake-operating arm. Excessive arm movement, indicating brake action slack, causes the pawl on the slide to engage the ratchet wheel, turning the rotatable shaft to adjust the brake cam to reduce slack. Preferably, the push rod connects to the clevis of the air cylinder actuating rod, with override linkage between the actuating rod and the push rod.

INVENTOR
JAMES L. BOSTWICK
BY
Paul A. Weilein
ATTORNEY

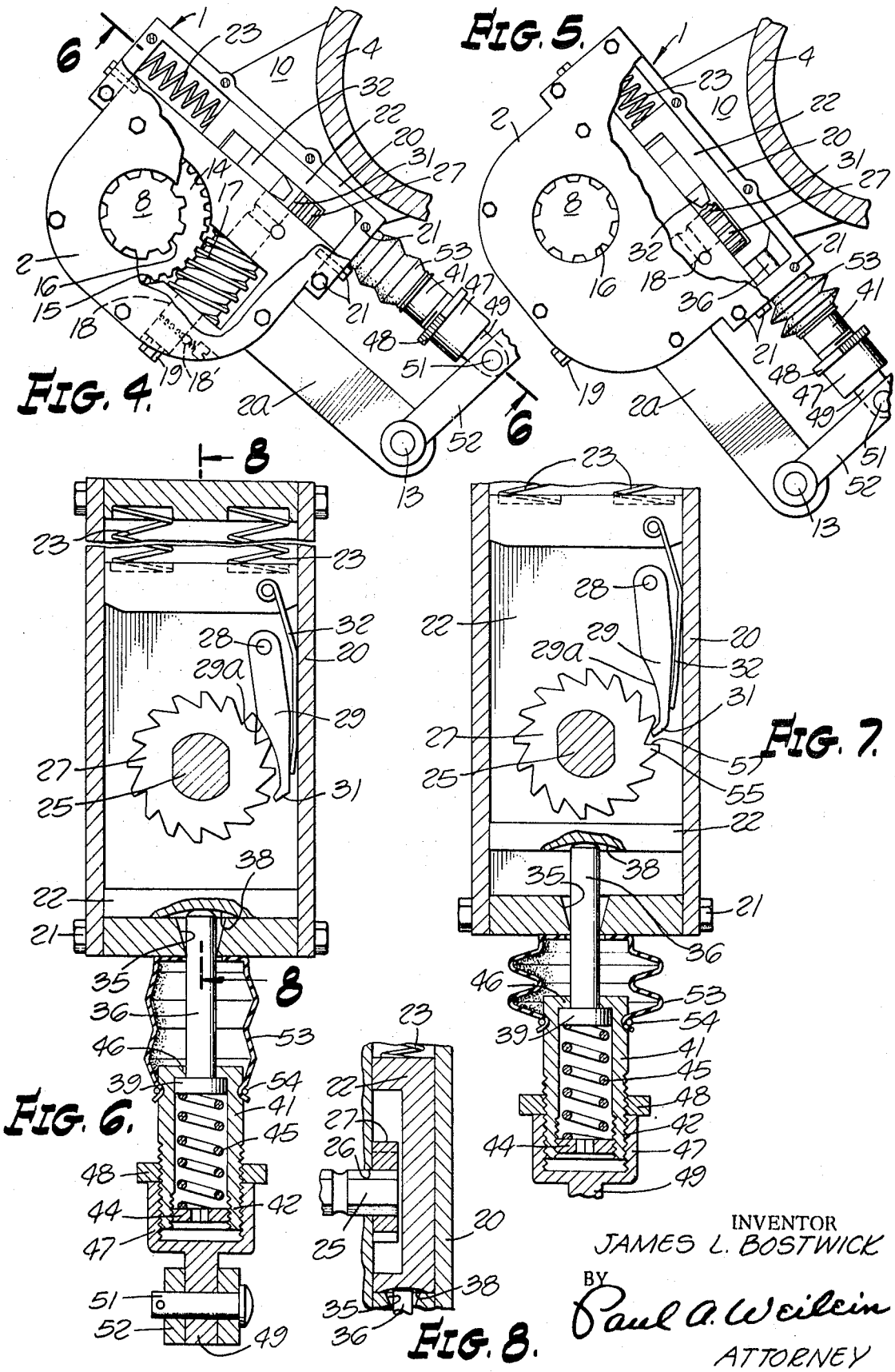

AUTOMATIC BRAKE-ADJUSTING DEVICE

BACKGROUND OF THE INVENTION

The invention relates to vehicle brakes and more particularly to an automatic slack adjuster unit for brakes which are pneumatically actuated. It is desirable in such brakes to maintain a minumum spacing between the lining on the brakeshoe which is actuated pneumatically and the drum of the wheel against which the brake lining acts to retard wheel motion. Many previous devices have been devised and marketed to effect proper spacing or "slack" adjustment of the brake lining with respect to the brakedrum. My previously granted U.S. Pat. Nos. 3,121,478 issued Feb. 18, 1964, and No. 3,307,661 issued Mar. 7, 1967, are representative of the cam brake apparatus with manual slack adjustment to which the present invention is directed.

Previous devices have accomplished some degree of automatic control of the brake slack. However, such devices have not been easily adapted to standard brake equipment and standard slack adjustment mounting means and have been susceptible to road dirt, flying rocks, freezing, and other deleterious conditions which affect the operation and longevity of the devices. Other devices have been complicated in operation or have required operative linkage which is affected by road conditions in either the power or retraction stroke of the brake-operating arm (which conventionally is operated from the pneumatic cylinder of the brake system). Some previous devices interfere with manual adjustment of the brakeshoes to remove the wheel drum for periodic maintenance.

SUMMARY OF THE INVENTION

It is an object of this invention to provide a novel and efficient automatic slack adjuster with an actuator portion for the brake-operating arm of a known manually operable slack adjuster in such a manner that slack adjuster means embodied in the arm operates automatically to adjust the brakes in response to overtravel of the arm such as caused by wear in the brakeshoe lining or due to slack otherwise present in the brake system. No change in the construction of the slack adjuster arm and brake-adjusting means therein is required except for removal of the shaft in the brake-adjusting means of the arm and the substitution of a shaft having slightly greater length than the one removed.

It is another object of the invention to provide a slack adjuster in which desirable simplicity and inexpensive construction as well as efficiency are achieved by providing in association with the brake-operating arm of the slack adjuster unit a slider, spring means biasing the slider to a predetermined position, and a pushrod bearing on the slider and pivotally connected to the brake arm actuating rod remote from the slider. Operating means of simple form is provided in operative connection with the slider and brake-adjusting means in the brake-operating arm in an arrangement such that should the brake-operating arm travel beyond a predetermined extent in applying the brakes, the rod moves the slider with respect to a ratchet wheel on the slack-adjusting means and a wheel-contacting pawl carried by the slider actuates the brake-adjusting means.

It is a further object of the invention to provide means whereby adjustment of the slack may derive from either the power or the retracting stroke of the brake-operating arm without interfering with normal manual regulation of the shoe-to-drum clearance as desired.

Another object of this is to provide an actuator device wherein the pushrod is coupled to the brake-actuating rod by spring means of greater strength than the spring means which bias the slider so that should the pushrod travel be excessive in applying the brakes, the spring means coupled to the pushrod yields and thereby permits overtravel of the arm with respect to the pushrod without causing damage or dislodgement of the slider.

In the accomplishment of the foregoing objects, the automatic brake-adjusting device of the invention contemplates, in combination with a brake power cylinder and a brake-operating arm for a cam brake with manual slack-adjusting means including a shaft rotatable to effect slack adjustment, a housing fixed to move with the brake-operating arm having an opening through which a rotatable shaft projects. A ratchet wheel is fixed to the shaft projection within the housing. A slider is movable in the housing adjacent the ratchet wheel. The slider carries a pawl which is spring loaded into contact with the wheel. A pushrod protrudes into the housing and thrusts against the slider to displace it with respect to the ratchet wheel. Spring means bias the slider against displacement by the pushrod. Resilient means join the pushrod to the operating arm actuating rod for imparting motion to the slider responsive to power and retracting strokes of the brake-operating arm. Preferably, the resilient means has resistance to distortion greater than the resistance to distortion of the biasing spring means. Thus, the pushrod motion displaces the slider to cause the pawl to engage the ratchet wheel on one stroke of the arm to rotate the shaft to effect slack adjustment in response to the magnitude of the operating arm stroke. Preferably, the pawl is mounted to the slider such that the pawl engages the ratchet wheel on the retraction stroke of the brake-operating arm. Alternatively, the pawl may be so mounted to the slider to engage the ratchet wheel on the power stroke of the brake-operating arm.

BRIEF DESCRIPTION OF THE DRAWINGS

FIG. 4 is an enlarged fragmentary side elevational view partly in section of the brake adjuster device of this invention as applied to the manually operable slack-adjusting arm with a part of the latter broken away for clarity of illustration, all parts being shown in the position in which they are disposed when the brakes are released;

FIG. 5 is an enlarged fragmentary side elevation and part sectional view corresponding to FIG. 4 showing the actuator device of this invention as it would appear when ready for automatic operation to actuate the brake-adjusting device in the slack-adjusting arm to which it is attached;

FIG. 6 is an enlarged sectional view taken on the line 6—6 of FIG. 4 particularly illustrating the spring-loaded slider and associated means when in the normal or predetermined position in which it is held by the spring means therefor, the parts being shown in the position in which they are disposed when the brakes are released;

FIG. 7 is a fragmentary view corresponding to FIG. 6 with the parts of the actuator portion cocked and ready to be operated under the force of the spring means therein for actuating the brake-adjusting means in the slack-adjusting arms;

FIG. 8 is a reduced fragmentary sectional view taken on the line 8—8 of FIG. 6.

DESCRIPTION OF THE PREFERRED EMBODIMENTS

Figure 1:
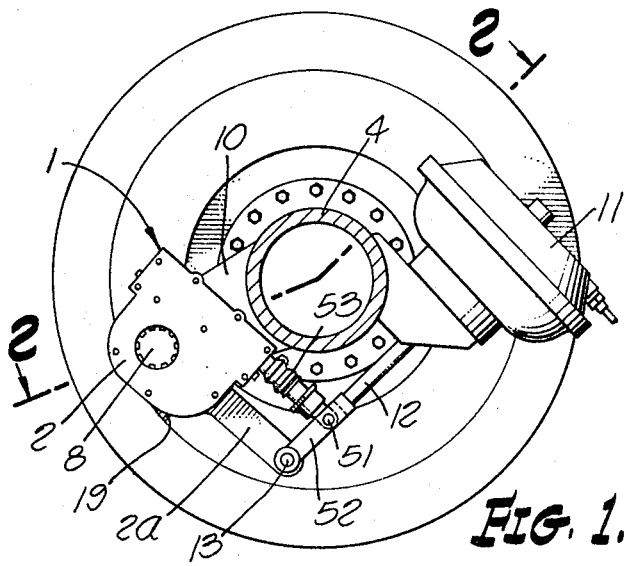
FIG. 1 is a side elevational view of a brake adjuster device embodied in the present invention.

In the accompanying drawings, there is shown an actuator device 1 embodying this invention mounted on the slack adjuster and brake-operating arm 2 of a conventional cam-actuated brake unit. This unit includes a brakedrum 3 supported on an axle 4 proximate brakeshoes 5 held in releasing position by spring means 6. Cam means 7 is operable to move the shoes for applying the brakes in response to turning of a camshaft 8 supported by a bracket 10 fixed to the axle housing. The arm 2 is fixed to the shaft 8 for turning the same to apply and release the brakes, the arm being actuated by a power cylinder unit 11 having an actuating rod 12 pivoted at 13 to the arm. The slack adjuster and brake-operating arm 2 is conventional and includes the usual manually operable means for adjusting the brakes (see FIG. 4). This adjusting means includes a worm gear 14 rotatably supported in suitable bearings (not shown) in the hollow interior 15 of the arm 2 and splined as at 16 on the shaft 8. A worm 17 meshing with the worm gear 14 is mounted on the rotatable shaft 18 journaled in the arm 2. An end 19 of the shaft protrudes from the arm 2 so that it may be engaged and turned for manually adjusting the brakeshoes. The shaft 18 is held against unintentional movement by spring-loaded detent means 18' shown in dotted lines in FIG. 4.

In accordance with the present invention, the actuator device 1 is attached to the arm 2 and operates in response to predetermined movements of this arm to actuate the brake-adjusting means including the shaft 18, worm 17, worm gear 14, shaft 8, and cam means 7.

As shown in FIGS. 4–8, the actuator device includes an elongate housing 20 secured by fastenings 21 to the arm 2 so as to move therewith when the arm is moved in opposite directions in applying and releasing the brakes. A slider 22 in housing 20 is biased by spring means 23 to occupy a predetermined position at one end of the housing. This position is shown in FIGS. 4 and 6. An end 25 of shaft 18 protrudes into housing 20 adjacent slider 22 through housing opening 26. A ratchet wheel 27 is conventionally secured on protruding end 25 on the flatted portion thereof, as can be seen in FIGS. 7 and 8. A pivot pin 28 secures a pawl 29 of the push type to the slider such that an engaging end 31 of the pawl is adjacent the ratchet wheel. A flat spring 32 biases the engaging end of the pawl into operational proximity with the ratchet wheel. One wall of housing 20 has a flaring aperture 35 through which a pushrod 36 projects. The inner end of the pushrod seats in a recess 38 in the slider. The opposite end of the pushrod has a head 39 seated in a hollow cylindrical connector 41. The end 42 of the connector opposite the pushrod is both externally and internally threaded. The internal threads receive a keeper 44 which retains an override compression spring 45 within the connector. The override spring forces the rod head into registry with an end wall 46 of the cylinder.

The external threads of the connector are engaged by an internally threaded cup 47 which may be locked in position on the connector by a locknut 48. A cup tongue 49 extends from the cup to a pivot pin 51 in a clevis 52 of the brake-actuating rod 12. A sealing boot 53 is fixed releasably to the cylinder between the cylinder and the adjacent wall of the housing 20 by a snapring 54. The boot surrounds the pushrod externally and effectively seals the aperture in the housing wall against penetration by road dirt and other foreign particles.

The aperture 35 is conical, being larger in outer diameter than the diameter of the pushrod and flaring to a greater inner aperture diameter such that the pushrod is free to react to the change in angle which the pushrod assumes under urging by actuating rod 12. It is apparent that application of power to the power cylinder 11 results in extension of actuating rod 12 such that brake-operating arm 2 rotates about the axis of shaft 8, causing the shaft to change the attitude of brake cam 7 and applying the brakes. As the operating arm moves about the centerline of the shaft, the distance between the pivot pin 51 of the pushrod connector and housing 20 shortens, thrusting the pushrod against the slider and the biasing springs 23 such that the engaging end of the pawl is dragged past the teeth on the ratchet wheel. On the retraction stroke the pawl-engaging end 31 thrusts against a tooth 55 of the ratchet wheel, turning shaft 18 as the slider, under the urging of the bias springs 23 returns to the position of FIG. 6, the relaxed position of the brake. As the shaft 18 turns, the worm 17 turns worm gear 14 and shaft 8. Rotation of shaft 8 changes the attitude of the cam 7, limiting the return of the brakeshoes 5 under the urging of springs 6. Thus, the slack adjuster is automatically set such that the shoes assume a new orientation with respect to brakedrum 3.

If the travel of the brake-operating arm is excessive, the pawl will move as shown in FIG. 7 to a point beyond the radial flat 57 of a ratchet wheel tooth. Such excessive movement indicates too great an amount of "slack" or brake lining spacing from the brakedrum surface. On the retraction stroke of the brake-operating arm, engaging end 31 engages tooth flat 57, and, held by spring 32, causes clockwise rotation of ratchet wheel 27 with resultant adjustment of the brake cam 7. When the slack or spacing is not great, displacement of slider 22 by pushrod 36 is not as great as that illustrated in FIG. 7 and engaging end 31 of the pawl does not pass beyond the flat 57. Therefore, on the retraction stroke-engaging end 31 moves down the ramp of the tooth without advancing the wheel, until arcuate edge 29a of the pawl is displaced outwardly by contact with other wheel teeth. Therefore, no change in the arcuate position of wheel 27 takes place.

Many actuations of the brake system may occur before sufficient wear develops in either the lining or other components of the braking system to cause sufficient slider displacement on actuation from the position of FIG. 6 to achieve the position of FIG. 7 wherein the retraction stroke brings the pawl into ratchet wheel advancement contact.

During the retraction stroke of the brake-operating arm it may be that the slider is inhibited in its return to the position of FIG. 6 by excessive friction due to freezing or dirt or other inhibitors within the actuator portion. Unlike other systems, no damaging effect results from these conditions. Since there is no positive connection between the pushrod and the slider, the pushrod merely is withdrawn by motion of the actuator rod out of contact with the slider. The biasing springs 23 continue to urge the slider in retraction at a pace dictated by the frictional conditions and not by the pushrod stroke. On the power stroke the spring-loaded connector is superior to a rigid connection in that it cannot be damaged due to friction, freeze or anything that might impede the movement of the slider and the pawl. On brake application, if friction or other delaying factors affect slider movement the applied energy is absorbed by the override spring, allowing the slide to advance at the rate dictated by the friction load.

It is therefore preferred that the pawl be mounted as shown in FIGS. 6 and 7 such that adjustment is made on the retraction stroke when the stroke speed is not as great and the friction induced is therefore less. The return of the slider is positive, being induced by the springs 23 and sided by road vibration in overcoming frictional loads.

Figure 9:
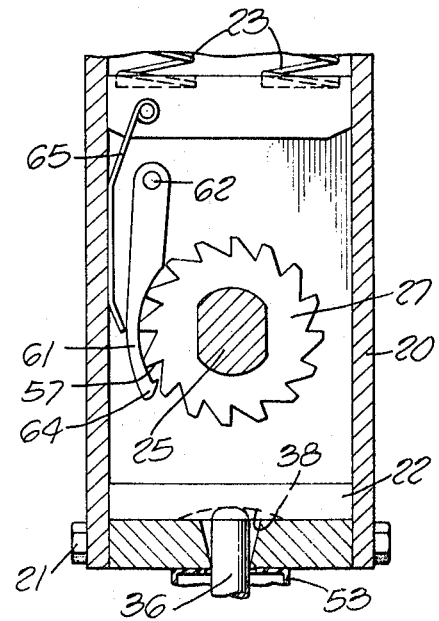
FIGS. 9 and 10 are views of an alternate embodiment of the invention respectively similar to FIGS. 6 and 7 of the previously set forth embodiment.
Figure 3:
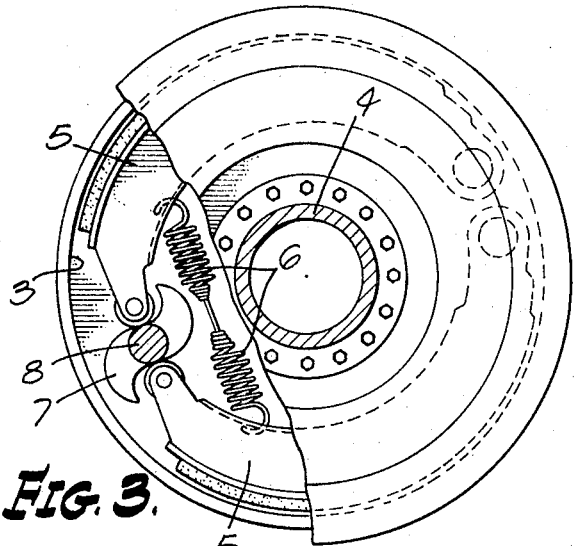
FIG. 3 is a cross-sectional view taken along the line 3—3 of FIG. 2 with parts broken away and other parts shown in elevation for clarity of illustration.
Figure 2:
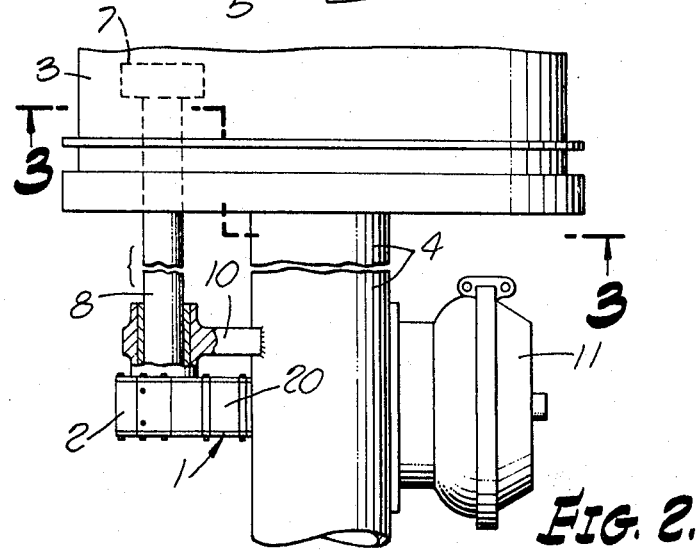
FIG. 2 is a sectional view taken along the line 2—2 of FIG. 1 showing in section and top plan the axle and brake assembly with the brake-actuating device of this invention associated therewith.
Figure 10:
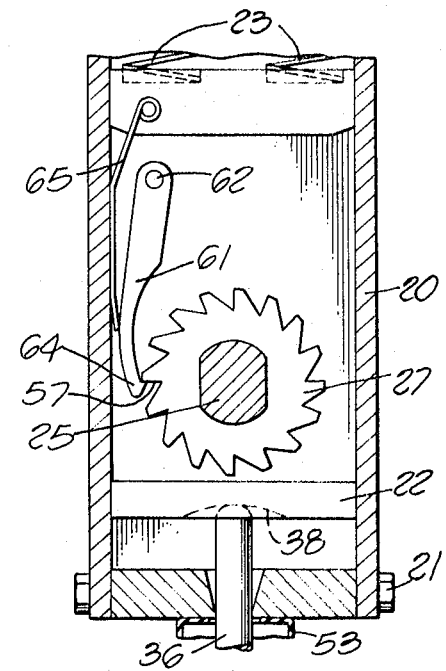

Despite the advantages of actuating slack adjustment on the retraction stroke of the brake-operating arm, an effective braking device may be embodied in apparatus in which slack adjustment is accomplished on the power or brake actuation stroke. Such a device is illustrated in FIGS. 9 and 10. Like the previous embodiment the housing 20 is arranged to move with the brake-operating arm. An end 25 of the rotating shaft 18 projects into the housing and receives a ratchet wheel 27. The rotating shaft is similar to the shaft 18 of the previously described embodiment and operation is substantially similar.

A slider 22 within the housing is biased by springs 23 against the thrust of a pushrod 36 which is guided by aperture 35 in a wall of the housing. Like the pushrod 36 of the previous embodiment, the pushrod of the embodiment of FIGS. 9 and 10 is actuated through its connection to the brake-operating arm-actuating rod 12.

The slider 22 carries a pawl 61 which is pivotally mounted to the slider by a pivot pin 62 transversely opposite the pawl of the previously described embodiment. Pawl 61 in this embodiment is of the pull type and has a hooked engaging end 64. The pawl is urged into contact with the ratchet wheel 27 on shaft 25 by a flat spring 65 secured to the slider.

FIG. 9 illustrates the relaxed or released position of the actuator portion of the slack adjuster of the invention. Pawl 61 is in contact with the ratchet wheel 27, but does not have its hooked end engaged with a wheel tooth. As pushrod 36 is extended into housing 20, as shown in FIG. 9, slider 22 moves upwardly, as shown in FIG. 10, and carries pawl 61 along ratchet wheel 27 such that the hooked engaging end 64 contacts tooth flat 57 and advances the tooth into the position shown, thus causing clockwise rotation of wheel 27 and shaft 25. As in the previously described embodiment, rotation of shaft 25 results in repositioning of the cam 7, changing the interval between the brakeshoe lining and the brakedrum 3.

When the brake-operating arm is retracted, springs 23 urge the slider back into the position of FIG. 9 with pawl 61 overriding the teeth of the wheel without affecting the position thereof. In the position of FIG. 9 the ratchet wheel may be manually adjusted clockwise without interference by the pawl. Counterclockwise adjustment will be limited, depending upon the position of engaging end 64 with respect to the flat of an adjacent tooth.

In both embodiments the effective displacement of the slider may be adjusted by changing the relative positions of cup 47 and the cylindrical connector. Locknut 48 may be loosened to provide relative rotation of the connector to the cup and thus change the spacing between pin 51 and housing 20, affecting the length of the pushrod assembly. Adjustment of the length of the rod is needed to compensate for variations in the angle between actuator arm or rod 12 and brake-operating arm extension 2a. Initial drum clearance may also be set by the manual adjuster 19 and then maintained by adjusting to a proper rod length. When the length of the rod is increased the drum-to-shoe clearance is decreased. When the rod is shortened the drum-to-shoe clearance is increased.

Since the angle of the actuating rod 12 to the brake-operating arm 2 may vary slightly due to differences in positions of the cylinder 11 and mounting bracket, further adjustments of the pushrod length are sometimes advisable. The override spring compensates for overtravel of the rod if the unit is installed without preliminary manual adjustment. The full travel of the pushrod in a typical installation when fully released for drum removal is three-quarters of an inch. Approximately three-eighths of an inch is the total travel distance of slider 22 within the housing. Therefore, the override spring protects the slider against such eventualities as installation without preliminary manual adjustment.

I claim:

1. The combination with a braking mechanism in which braking elements are spring urged to nonbraking relation and are movable into braking engagement by rotatable cam means connected with a swingable brake-operating arm connected for relative movement at its outer end to a reciprocable power delivery element of a power unit, of automatic slack-adjusting means comprising:
   a. means carried by said operating arm for adjustably varying its connected angular relationship with respect to the axis of rotation of said cam means so as to change the cam position with slack-adjusting movements, said means including a rotatable shaft;
   b. a toothed ratchet wheel carried by said shaft;
   c. a member carried on said arm for movement in opposite directions;
   d. a spring urging said member in one direction;
   e. means for moving said member in an opposite direction against said spring, said means having a mechanical connection with said power delivery element such that the movement of said member is effected by the relative angular movement between said element and said operating arm; and
   f. a pawl carried by said member having an end engageable with the teeth of said ratchet wheel and operable to advance said ratchet wheel and rotate said shaft to provide slack-adjusting movements of said cam means.

2. The combination according to claim 1, wherein the mechanical connection of said means, for moving said member, with said power delivery element is in spaced relation to the element connection with the outer end of said operating arm.

3. The combination according to claim 1 wherein the pawl is operatively mounted to advance the ratchet wheel in response to a power stroke of the brake-operating arm.

4. The combination according to claim 1 wherein the pawl is operatively mounted to advance the ratchet wheel in response to a retracting stroke of the brake-operating arm.

5. In combination with a brake power cylinder with an actuating rod connecting to a brake-operating arm for a cam brake with manual slack-adjusting means including a shaft rotatable to effect slack adjustment, the combination comprising:
   1. a housing fixed to move with the brake-operating arm,
      a. a rotatable shaft projection into the housing,
      b. a ratchet wheel fixed on the shaft in the housing,
      c. a slider movable in the housing adjacent the ratchet wheel,
      d. a pawl on the slider,
      e. a spring biasing the pawl into contact with the wheel;
   2. a pushrod protruding into the housing and adapted to thrust against and displace the slider with respect to the ratchet wheel;
      a. spring means biasing the slider against displacement by the pushrod
      b. resilient means joining the pushrod to the brake-operating arm for imparting motion to the slider responsive to power and retracting strokes of the brake-operating arm; said resilient means having resistance to distortion greater than the resistance to distortion of the biasing spring means;
      c. said pushrod motion causing the pawl to engage the ratchet wheel on one stroke of the arm to rotate the shaft to effect slack adjustment in response to the magnitude of the power arm stroke; and
   3. said pawl contact with the ratchet wheel after the retraction stroke of the brake-operating arm leaving the wheel free for manual adjustment of the shaft rotatable to effect slack adjustment.

6. Apparatus in accordance with claim 5 wherein the joining means comprises a closed cylinder housing the spring, a rod head engaging the cylinder, an override spring biased against the head, a cup adjustably fixed to the cylinder, and a tongue on the cup pivotally secured to the brake-operating arm actuating rod.

7. Apparatus in accordance with claim 5 wherein a pivot pin mounts the pawl to engage the wheel on the power stroke of the brake-operating arm.

8. Apparatus in accordance with claim 5 wherein a pivot pin mounts the pawl to engage the wheel on the retracting stroke of the brake-operating arm.

* * * * *